(12) United States Patent
Shachar et al.

(10) Patent No.: US 9,031,086 B2
(45) Date of Patent: May 12, 2015

(54) RESPONDING TO DYNAMICALLY-CONNECTED TRANSPORT REQUESTS

(71) Applicant: Mellanox Technologies Ltd., Yokneam (IL)

(72) Inventors: Ariel Shachar, Jerusalem (IL); Michael Kagan, Zichron Yaakov (IL); Noam Bloch, Bat Shlomo (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 14/277,793

(22) Filed: May 15, 2014

(65) Prior Publication Data

US 2014/0247832 A1 Sep. 4, 2014

Related U.S. Application Data

(63) Continuation of application No. 13/535,382, filed on Jun. 28, 2012, now Pat. No. 8,761,189.

(51) Int. Cl.
*H04L 12/12* (2006.01)
*H04L 5/00* (2006.01)
*H04L 12/801* (2013.01)

(52) U.S. Cl.
CPC .............. *H04L 5/0055* (2013.01); *H04L 47/10* (2013.01)

(58) Field of Classification Search
None
See application file for complete search history.

(56) References Cited

U.S. PATENT DOCUMENTS

| 8,213,315 B2 * | 7/2012 | Crupnicoff et al. ........... 370/236 |
| 2007/0299970 A1 * | 12/2007 | Huang et al. .................. 709/225 |

* cited by examiner

*Primary Examiner* — Alex Skripnikov
(74) *Attorney, Agent, or Firm* — D. Kilgler I.P. Services Ltd.

(57) ABSTRACT

A method for communication, includes allocating, in a network interface controller (NIC) a single dynamically-connected (DC) initiator context for serving requests from an initiator process running on the initiator host to transmit data to multiple target processes running on one or more target nodes. The NIC transmits a first connect packet directed to a first target process and referencing the DC initiator context so as to open a first dynamic connection with the first target process. The NIC receives over the packet network, in response to the first connect packet, a first acknowledgment packet containing a first session identifier (ID). Following receipt of the first acknowledgment packet, the NIC transmits one or more first data packets containing the first session ID over the first dynamic connection from the NIC to the first target process. Dynamic connections with other target processes may subsequently be handled in similar fashion.

14 Claims, 4 Drawing Sheets

RESPONDING TO DYNAMICALLY-CONNECTED TRANSPORT REQUESTS

CROSS-REFERENCE TO RELATED APPLICATION

This application is a continuation of U.S. patent application Ser. No. 13/535,382, filed Jun. 28, 2012.

FIELD OF THE INVENTION

The present invention relates generally to computer networks, and specifically to process-to-process communication over such networks.

BACKGROUND

InfiniBand™ (IB) is a switched-fabric communications architecture primarily used in high-performance computing. It has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA). IB defines both a layered hardware protocol (physical, link, network, and transport layers) and a software layer, which manages initialization and communication between devices. The transport layer is responsible for in-order packet delivery, partitioning, channel multiplexing and transport services, as well as data segmentation when sending and reassembly when receiving.

InfiniBand specifies the following transport services:

Reliable Connection (RC). RC provides reliable transfer of data between two entities, referred to as a requester and a responder. As a connection-oriented transport, RC requires a dedicated queue pair (QP) for each pair of requester and responder processes.

Unreliable Connection (UC). UC permits transfer of data between two entities. Unlike RC, UC but does not guarantee message delivery or ordering. Each pair of connected processes requires a dedicated UC QP.

Reliable Datagram (RD). Using RD enables a QP to send and receive messages from one or more QPs using a reliable datagram channel (RDC) between each pair of reliable datagram domains (RDDs). RD provides most of the features of RC, but does not require a dedicated QP for each process.

Unreliable Datagram (UD). With UD, a QP can send and receive messages to and from one or more remote QPs, but the messages may get lost, and there is no guarantee of ordering or reliability. UD is connectionless, allowing a single QP to communicate with any other peer QP.

Raw Datagram. A raw datagram is a data link layer service, which provides a QP with the ability to send and receive raw datagram messages that are not interpreted.

A recent enhancement to InfiniBand is the Extended Reliable Connected (XRC) transport service (as described, for instance, in "Supplement to InfiniBand™ Architecture Specification Volume 1.2.1, Annex A14: Extended Reliable Connected (XRC) Transport Service", 2009, Revision 1.0). XRC enables a shared receive queue (SRQ) to be shared among multiple processes running on a given host. As a result, each process can maintain a single send QP to each host rather than to each remote process. A receive QP is established per remote send QP and can be shared among all the processes on the host.

U.S. Patent Application Publication 2011/0116512, whose disclosure is incorporated herein by reference, describes a dynamically-connected (DC) transport service, in which a single DC initiator context is allocated for serving multiple requests from an initiator process running on an initiator host to transmit respective data to multiple target processes running on one or more target nodes. A first connect packet referencing the DC initiator context is directed to a first target process so as to open a first dynamic connection with the first target process, followed by transmission of first data. The first dynamic connection is closed after the transmission of the first data, and a second connect packet is transmitted so as to open a second dynamic connection with a second target process, followed by transmission of second data.

SUMMARY

Embodiments of the present invention that are described hereinbelow provide dynamically-connected transport services with enhanced functionality.

There is therefore provided, in accordance with an embodiment of the present invention, a method for communication, which includes allocating, in a network interface controller (NIC) coupled to an initiator host, a single dynamically-connected (DC) initiator context for serving requests from an initiator process running on the initiator host to transmit data, via a packet network, to multiple target processes running on one or more target nodes. A first connect packet is transmitted from the NIC over the packet network, directed to a first target process and referencing the DC initiator context so as to open a first dynamic connection with the first target process. A first acknowledgment packet containing a first session identifier (ID) is received at the NIC over the packet network in response to the first connect packet. Following receipt of the first acknowledgment packet, one or more first data packets containing the first session ID are transmitted over the first dynamic connection from the NIC to the first target process.

After transmission of the first data, the first dynamic connection is closed, and a second connect packet is transmitted from the NIC over the packet network, directed to a second target process and referencing the DC initiator context so as to open a second dynamic connection with the second target process. In response to the second connect packet, a second acknowledgment packet containing a second session identifier (ID) is received at the NIC over the packet network. Following receipt of the second acknowledgment packet, one or more second data packets containing the second session ID are transmitted over the second dynamic connection from the NIC to the second target process.

Typically, the method includes receiving at the NIC over the packet network further acknowledgment packets in response to the first and second data packets. Closing the first dynamic connection may include waiting to receive at least one of the further acknowledgment packets in response to the first data packets before closing the first dynamic connection.

In a disclosed embodiment, closing the first dynamic connection includes transmitting a disconnect packet over the first dynamic connection, wherein the one or more target nodes do not acknowledge the disconnect packet.

In some embodiments, the method includes, upon a failure to receive the second acknowledgment packet within a predefined timeout period following transmission of the second connect packet, transmitting over the network a third connect packet directed to the second target process, and awaiting acknowledgment of the third connect packet before transmitting the one or more second data packets. The method may include receiving, at a target node on which the second target process is running, both the second and the third connect packets, and sending, from the target node over the network to the NIC, both the second acknowledgment packet containing the second session ID and a third acknowledgment packet containing the third session ID, and discarding, at the target node, any of the second data packets that contain the second session ID.

In a disclosed embodiment, transmitting the first connect packet includes inserting a packet serial number of a first one of first data packets into the first connect packet.

The method may include providing first and second configurations of the DC initiator context, wherein the first configuration causes the NIC to request and wait for the first and second acknowledgment packets, while in the second configuration the NIC transmits at least the first data packets immediately after the first connect packet without waiting for the first acknowledgment packet.

In one embodiment, the first and second target processes both run on a given target node, and the method includes allocating, at the given target node, a single dynamically-connected responder context for serving both the first and second dynamic connections.

There is also provided, in accordance with an embodiment of the present invention, a method for communication, which includes receiving, via a packet network, in a network interface controller (NIC) coupled to a responder host, at least first and second connect packets from first and second initiator processes running on one or more initiator nodes to open respective first and second dynamic connections with respective first and second target processes running on the responder host. A single shared dynamically-connected responder context is allocated in the network interface device for serving successively both the first and second dynamic connections. First data are received in the NIC from the first initiator process over the first dynamic connection using the shared dynamically-connected responder context and are conveyed from the NIC to the first target process. The first dynamic connection is closed after receipt of the first data, and then second data are received in the NIC over the second dynamic connection using the shared dynamically-connected responder context and conveyed from the NIC to the second target process.

Closing the first dynamic connection may include receiving a disconnect packet over the first dynamic connection and closing the first dynamic connection in response to the disconnect packet. Alternatively or additionally, closing the first dynamic connection may include waiting for a predefined timeout period to receive a data packet containing the first data, and closing the first dynamic connection in response to expiration of the timeout period without arrival of the data packet.

In some embodiments, the method includes holding responder contexts in a cache in the NIC, wherein receiving the second data includes checking the cache for idle dynamically-connected responder contexts that can be used by the second target process, and selecting the shared dynamically-connected responder context from the cache for use in setting up the second dynamic connection.

There is additionally provided, in accordance with an embodiment of the present invention, apparatus for communication, including a network interface, coupled to a packet network. A host interface is coupled to receive requests from an initiator process running on an initiator host to transmit data, via the packet network, to multiple target processes running on one or more target nodes. Processing circuitry is configured, using a single dynamically-connected (DC) initiator context for serving requests the initiator host, to transmit via the network interface a first connect packet directed to a first target process and referencing the DC initiator context so as to open a first dynamic connection with the first target process. The circuitry receives via the network interface, in response to the first connect packet, a first acknowledgment packet containing a first session identifier (ID), and following receipt of the first acknowledgment packet, transmits one or more first data packets containing the first session ID via the network interface over the first dynamic connection to the first target process.

The processing circuitry is configured to close the first dynamic connection after transmission of the first data, and to transmit via the network interface a second connect packet directed to a second target process and referencing the DC initiator context so as to open a second dynamic connection with the second target process. The circuitry receives via the network interface, in response to the second connect packet, a second acknowledgment packet containing a second session identifier (ID), and following receipt of the second acknowledgment packet, transmits one or more second data packets containing the second session ID via the network interface over the second dynamic connection to the second target process.

There is further provided, in accordance with an embodiment of the present invention, apparatus for communication, including a host interface, which is coupled to communicate with target processes running on a responder host. A network interface is coupled to receive from a packet network at least first and second connect packets from first and second initiator processes running on one or more initiator nodes to open respective first and second dynamic connections with respective first and second target processes running on the responder host. Processing circuitry, is configured to allocate a single shared dynamically-connected responder context for serving successively both the first and second dynamic connections, and to receive via the network interface first data from the first initiator process over the first dynamic connection using the shared dynamically-connected responder context. The circuitry is configured to convey the first data via the host interface to the first target process, to close the first dynamic connection after receipt of the first data, and then to receive via the network interface second data over the second dynamic connection using the shared dynamically-connected responder context and to the second data via the host interface to the second target process.

The present invention will be more fully understood from the following detailed description of the embodiments thereof, taken together with the drawings in which:

DETAILED DESCRIPTION OF EMBODIMENTS

Overview

The dynamically-connected (DC) transport service, as described in the above-mentioned U.S. Patent Application Publication 2011/0116512, allows a DC QP to reliably communicate with multiple responder processes in multiple remote nodes. It is thus useful particularly in reducing the number of required QPs per end-node while preserving RC semantics. Using the DC transport service, an initiator NIC, coupled to an initiator host, can allocate a single DC initiator context to serve multiple requests from an initiator process running on the initiator host to transmit data over a packet network to multiple target processes running on one or more target nodes.

Each work request (WR) submitted to a DC send queue includes information identifying the target process on a specified node. In response to these work requests, DC initiator and responder contexts are tied to each other across the network to create dynamic (i.e., temporary), RC-equivalent connections between the initiator and different targets. These connections are used successively to reliably deliver one or more messages to each of the targets. When the initiator (i.e., the NIC of the sending end-node) reaches a point in its send queue at which either there are no further work queue elements (WQEs) to execute, or the next WQE is destined to another target process (possibly in a different node), the current dynamic connection is torn down. The same DC context is then used by the NIC to establish a new dynamic connection to the next target process.

Embodiments of the present invention that are described hereinbelow provide new features for the DC transport service that enhance its reliability and efficiency of implementation. In one embodiment, a handshake between the initiator NIC and responder NIC is used in setting up each dynamic connection. For this purpose, the initiator NIC transmits a connect packet, referencing the DC initiator context, over the packet network to a target process running on a target node. In reply to the connect packet, the responder NIC on the target node returns an acknowledgment packet containing a session identifier (ID). The initiator NIC waits to receive the acknowledgment packet, and then incorporates the session ID into the data packets that it sends over the dynamic connection to the target process.

As a result of this handshake, each dynamic connection receives a unique session ID, which is assigned by the DC responder in response to the connect request transmitted by the initiator. The responder checks the session ID in incoming data packets on dynamic connections and accepts only those packets that match the session ID that it assigned. Consequently, even if the initiator unnecessarily re-sends a connect request or data packet (due to failure to receive an acknowledgment packet, which may have been sent by the responder but was lost in the network, for example), there is no risk that the responder will accept the same message twice and overwrite data in the target memory, since the responder will recognize and reject packets with an incorrect session ID.

After the initiator has finished transmitting the requested data over the dynamic connection to one target, the initiator closes this dynamic connection and transmits another connect packet (again referencing the same DC initiator context) to the next target process so as to open a further dynamic connection. The responder NIC on this next target node responds by sending its own acknowledgment packet containing the unique session ID that it has assigned, and the interaction between initiator and target continues as described above.

Another embodiment of the present invention enables multiple DC targets to successively share the same DC responder context, and thus enhances the efficiency of DC handling on the responder side. This embodiment addresses situations in which a responder NIC receives a succession of DC connect packets and data, directed to respective target processes running on the responder host, from different initiator processes running on one or more initiator nodes. Each such connect packet has its own DC initiator context, which varies from initiator to initiator. The responder NIC, however, may use the same DC responder context for multiple dynamic connections involving different DC requesters and different DC target processes.

After setting up a first dynamic connection, the responder NIC receives data from the first initiator process using the shared DC responder context, and conveys the data to the appropriate target process. When this first dynamic connection is closed (typically due to a disconnect packet sent by the initiator, or possibly due to timeout), the shared responder context becomes available for use in setting up a new dynamic connection and may be used by the responder NIC to serve another target process on the same target node. The NIC then receives data transmitted from the new DC initiator via this new dynamic connection, using the same DC responder context as for the previous dynamic connection. This sort of responder context sharing is useful particularly when the NIC maintains a context cache, since it increases the likelihood that a suitable DC responder context will be available in the cache whenever a new dynamic connection is requested. As a result, the need to fetch new contexts from the target node memory is reduced, and the speed of setting up new dynamic connections is enhanced.

The disclosed embodiments are described, for the sake of clarity, with reference to IB protocols and aspects of the IB architecture. The principles of the present invention, however, may similarly be applied, mutatis mutandis, in process-to-process communications over packet networks of other types, such as high-speed Ethernet networks.

System Description

Figure 1:
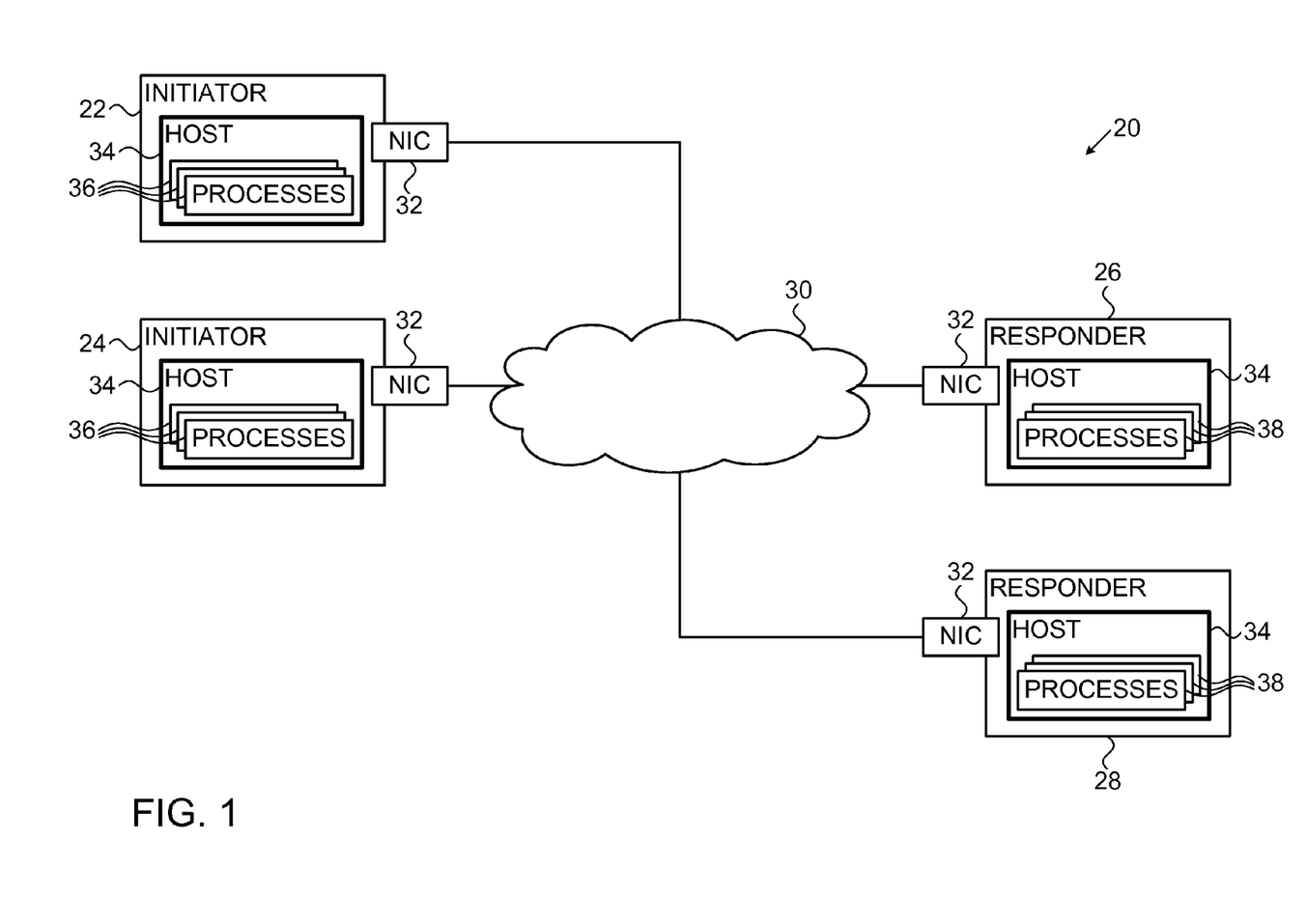
FIG. 1 is a block diagram that schematically illustrates a computer system, in accordance with an embodiment of the present invention.

FIG. 1 is a block diagram that schematically illustrates a computer system 20, which supports a DC transport service in accordance with an embodiment of the present invention. System 20 comprises nodes 22, 24, 26, 28, which are interconnected by a packet network 30, such as an IB switch fabric. In the pictured embodiment, nodes 22 and 24 are initiator nodes, while nodes 26 and 28 are responder nodes, but typically any given node may be both an initiator and a responder concurrently.

In this example, an initiator process from a group of processes 36 executing on a host 34 of an initiator node 22, 24 submits a work request to a NIC 32 (such as an IB HCA) to send a message to a target process from among a group of processes 38 executing on a host 34 of a target (responder) node 26, 28. Upon receiving the work request, NIC 32 of the initiator node attempts to establish a dynamic connection with the NIC of the responder node by sending a "DC Connect" packet, as described further hereinbelow. After sending the DC connect packet, NIC 32 may wait to receive an acknowledgment from the responder NIC, and then sends one or more data packets to the responder over the dynamic connection in order to fulfill the work request. The responder NIC replies by sending one or more acknowledgement packets to the DC receive queue of the initiator NIC. Once all the WQEs on the initiator NIC relating to this target process have been executed, the NICs on the initiator and responder nodes tear down the dynamic connection between the initiator and target processes, and the DC context on the initiator NIC becomes available to connect with other processes.

Thus, for example, an initiator process from the group of processes 36 executing on host 34 of node 22 may initially submit a first work request to NIC 32 to send one or more messages to a first target process from the group of processes 38 executing on host 34 of node 26. This initiator process may then subsequently submits a second work request to NIC 32 to send one or more messages to a second target process from the group of processes 38 executing on host 34 of node 28. Upon receiving the first work request, NIC 32 on node 22 establishes a dynamic connection with NIC 32 on node 26 and conveys data packets as described above.

Once NIC 32 on node 22 has finished executing the WQE corresponding to the first work request (including sending the data packets and receiving the appropriate acknowledgments from the responder) and detects a second WQE targeting a different target process, the NIC sends a DC disconnect packet to node 26 in order tear down the association between the target process and the DC context. NIC 32 on node 22 then attempts to establish a second dynamic connection with NIC 32 of node 28 by sending a DC connect packet. After sending the DC connect packet (and, typically, receiving an acknowledgment), the NIC on node 22 sends one or more data packets to the second target process over this second dynamic connection in order to fulfill the second work request. Once all the WQEs relating to the second target process have been executed, NIC 32 on node 22 sends a DC disconnect packet to node 28 in order tear down the association between the target process and the DC context, which now becomes available to make the next dynamic connection.

Although the simple example presented above relates to a single dynamic connection between an initiator process and two successive target processes, a single DC context may be used in connecting successively to three or more target processes, on the same target node or multiple different target nodes. Furthermore, a given initiator process may use multiple DC contexts to communicate over multiple dynamic connections of this sort concurrently. By the same token, processes 36 on both of initiator nodes 22 and 24 may initiate dynamic connections, using respective DC contexts, with one or more of processes 38 on a given target node (such as node 26). In an embodiment described below, responder NIC 32 on node 26 may use the same DC responder context successively to set up these dynamic connections.

Figure 2:
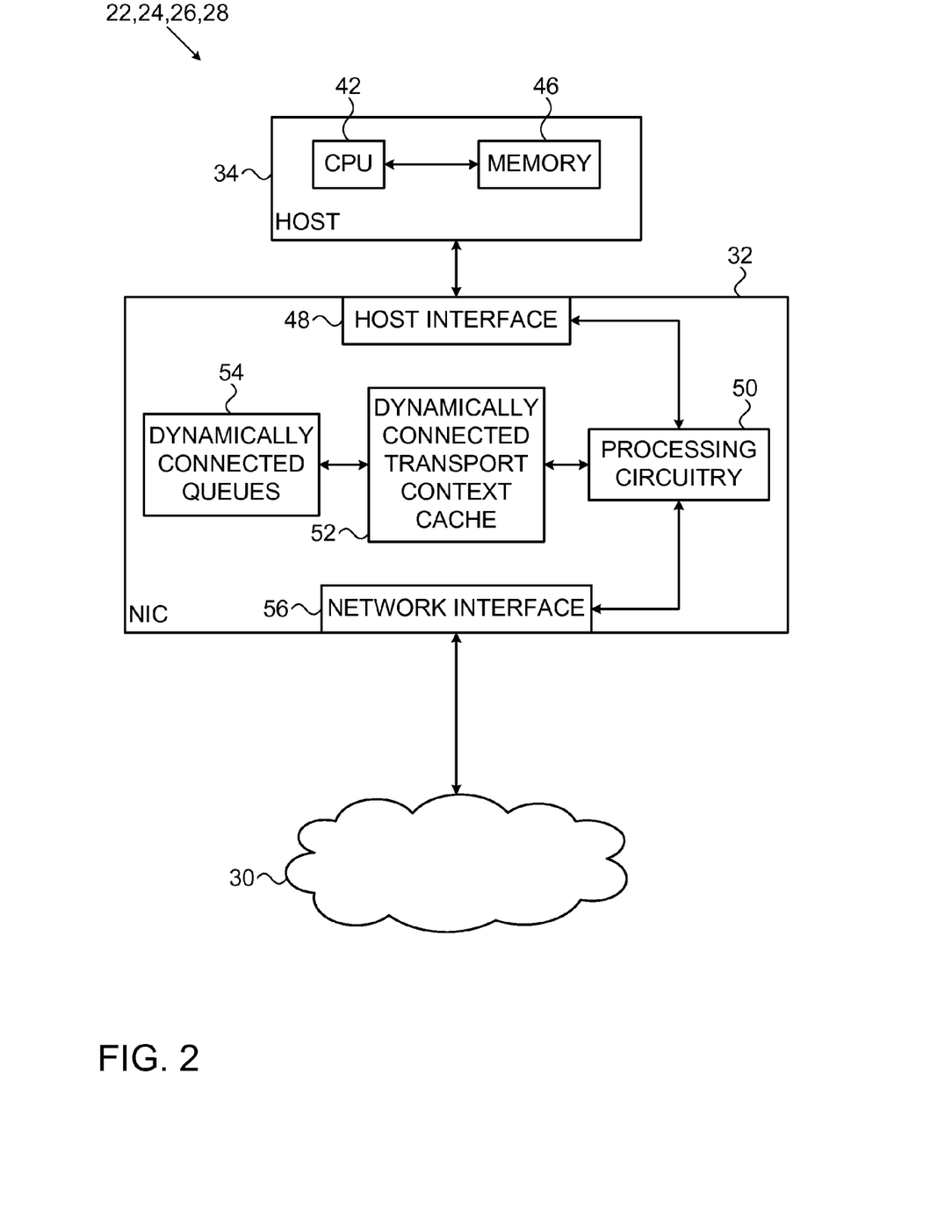
FIG. 2 is a block diagram that schematically shows details of a computing node, in accordance with an embodiment of the present invention.

FIG. 2 is a block diagram 40 that schematically illustrates functional components of nodes 22, 24, 26, 28, and particularly the elements of NIC 32 that are involved in providing DC transport service, in accordance with an embodiment of the present invention. Host 34 comprises a central processing unit (CPU) 42, which runs processes 36, 38, and a host memory 46. This memory is typically used to hold both process and system data and context information used by NIC 32. The NIC comprises a host interface 48 for communicating with host 34 and a network interface 56 for transmitting and receiving packets to and from network 30. These and other elements of NIC 32 are well known in the art, and only those functional elements of the NIC that are directly related to DC functionality will be described here. Further aspects of DC operation are described in the above-mentioned U.S. Patent Application Publication 2011/0116512.

In the present example, on the initiator side, NIC 32 receives a work request, such as a remote direct memory access (RDMA) request, from CPU 42 via host interface 48. Carrying out the work request involves transmitting one or more messages containing data from host memory 46 to network 30. In order to do so, processing circuitry 50 in NIC 32 uses a DC initiator context, which is typically stored in memory 46 and may be held in a DC transport context cache 52 in the NIC. The connection uses an initiator DC queue, which is selected from a group of DC queues 54 used by the NIC. Each initiator process 36 typically has its own set of one or more dedicated DC contexts that it exclusively owns. NIC 32 transfers these DC contexts between host memory 46 and DC context cache 52 as needed.

NIC 32 transmits data packets, via network interface 56, to responder nodes 26, 28 and receives acknowledgment packets from the responder node. (Handling of these acknowledgment packets is described below, in the next section of this description.) Once NIC 32 has sent all the data packets, processing circuitry 50 tears down the dynamic connection to the current responder node, and the DC responder context becomes available for a new connection.

At the responder (target) node, NIC 32 receives DC connect packets and message data packets from network 30 via its own network interface 56. The packets are directed to a particular target process 38, referred to as a DC Target (DCT), on the responder node. The NIC allocates a DC responder context to serve the connection. It is desirable that the context be chosen, if possible, from among those stored in cache 52 (and a method for sharing DC responder contexts that increases the probability of a cache hit in this situation is described below). Otherwise, processing circuitry 50 may fetch the appropriate context from memory 46. The association between the data packets sent by the DC requester and the specific DC responder context that is currently serving a given connection is maintained by processing circuitry 50 in NIC 32, based on the source QP number and the network address of the initiator.

Processing circuitry 50 in NIC 32 of the responder node returns acknowledgment packets to the initiator NIC. In the embodiment described below, these packets contain a session ID, which is assigned as part of a handshake process by circuitry 50 at the responder node. Alternatively, dynamic connections may be set up without a handshake or session ID, as described in U.S. Patent Application Publication 2011/0116512. Message data packets received via network interface 56 are queued and processed by circuitry 50, which checks the packet header information, including the session ID if present. If the header fields match the expected values—indicating that the dynamic connection is legitimate and correct—circuitry 50 saves the packet data in host memory 46 via interface 48 and notifies the target process that data are available for processing. Upon receiving a disconnect packet from the initiator, or upon failure to receive packets over a given dynamic connection for more than a predefined timeout period, processing circuitry 50 tears down the responder side of the dynamic connection, whereupon the DC responder context become available for reuse.

Dynamic Connection With Handshake

Figure 3A:
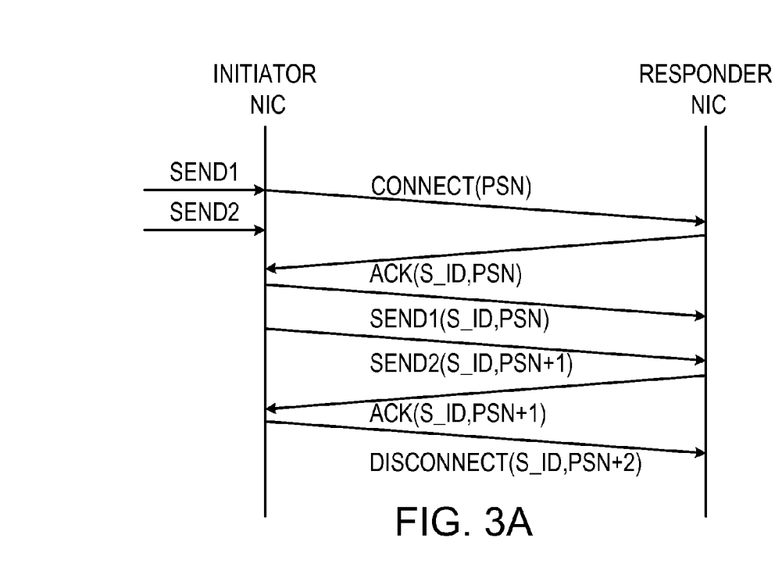
FIGS. 3A and 3B are communication ladder diagrams that schematically illustrate communications using a DC protocol with handshake between initiator and responder, in accordance with an embodiment of the present invention.

FIG. 3A is a ladder diagram that schematically illustrates a basic DC connect-data-disconnect sequence with handshake, in accordance with an embodiment of the present invention. Typically, the handshake is an optional feature of the DC transport service, and each DC initiator context may be configured to use or not use the handshake in accordance with system and user requirements. An initiator process 36 on node 22, for example, submits work requests to the initiator NIC 32, identified in the figure as "SEND1" and "SEND2." The work requests result in queuing of WQEs for execution by the NIC, invoking messages to be sent to a target process 38 executing, for example, on target node 26.

Upon receiving the first WQE, the initiator NIC recognizes that it is not connected to the requested DC target (DCT), and therefore sends a DC connect packet to the responder NIC on node 38. The connect packet identifies the destination process by means of the DCT, which is taken from the WQE and is inserted by the initiator NIC in the destination QP field of the basic transport header (BTH) in the connect packet. The connect packet may also contain a flag indicating whether or not handshake is requested in setting up this dynamic connection, and a packet serial number (PSN) value to be assigned to the first data packet that will be sent once the connection is established.

The responder NIC allocates a DC responder (DCR) context and sends an acknowledgement (ACK) data packet back to the initiator NIC. If handshake was requested in the connect packet, this ACK packet will contain, in addition to the BTH fields identifying the packet destination and context, a session ID (S_ID), which is uniquely allocated by the responder NIC to this particular dynamic connection. The ACK packet typically also echoes the PSN value that was transmitted in the DC connect packet.

After receiving the ACK packet in response to the DC connect packet, the initiator NIC sends message data packets, corresponding to the WQEs in its queue, to the responder NIC. Each of these data packets contains the session ID (S_ID) and a respective packet serial number, beginning from the value PSN in the first packet and incrementing the value in each subsequent data packet. The responder NIC checks the S_ID and PSN values against its own context information to ensure that they are the correct ones for the dynamic connection identified by the BTH of these packets. Checking the S_ID and PSN values in this manner ensures that the responder NIC will not receive and execute duplicate data messages, which could be sent by the initiator NIC, for example, if an acknowledgment from the responder was lost or delayed in network 30.

The responder NIC acknowledges the data packets that it receives with proper S_ID and PSN values by sending one or more further ACK packets. These ACK packets may be sent in response to every data packet received over the connection, or an ACK packet may be sent to acknowledge two or more successive data packets. In this latter case, which is illustrated in FIG. 3A, the ACK packet contains the PSN value (in this example, PSN+1) of the last data packet received in order, thus acknowledging implicitly all preceding packets on this dynamic connection. The responder NIC processes the data contained in these received packets as required, for example by writing the packet data to the appropriate location in host memory 46. When the responder NIC receives a data packet with an incorrect session ID, however, it silently drops the packet without acknowledgment or further processing.

After executing the last WQE in the DC send queue (or the last WQE directed to a particular target), the initiator NIC waits to receive acknowledgments (explicit or implicit) from the responder NIC for all the data packets that it has sent. If the initiator NIC fails to receive the expected ACK, it may retransmit some or all of the packets. After receiving the last ACK (i.e., an acknowledgment indicating that all packets were received at the responder NIC), the initiator NIC sends a disconnect packet to the responder. After receiving the disconnect packet, the responder NIC tears down the present DCT context, but does not respond with another ACK packet. Both the DC initiator context at node 22 and the DC responder context at node 26 become available for use in new dynamic connections.

Figure 3B:
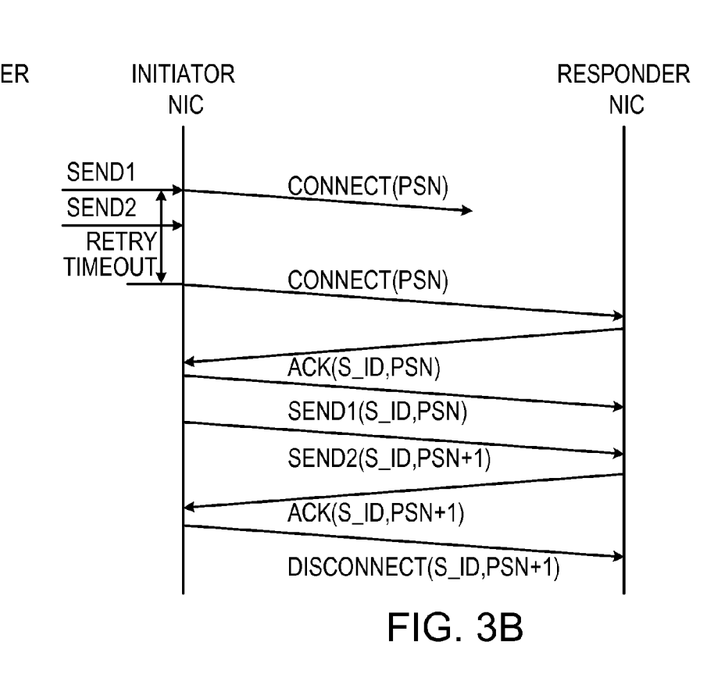

FIG. 3B is a ladder diagram that schematically illustrates a DC connect-data-disconnect sequence with handshake in a situation in which the initiator receives no response to its first DC connect packet, in accordance with an embodiment of the present invention. The sequence of packet transmission is again triggered by work requests ("SEND1" and "SEND2") submitted by an initiator process, which cause the initiator NIC to send a DC connect packet. The initiator then waits for the appropriate acknowledgment from the responder, but in this case does not receive it. The failure to receive the acknowledgment may stem, for example, from a network fault due to which the DC connect packet does not reach its target, or the acknowledgment sent by the target does not reach the initiator.

The initiator NIC waits for a certain predefined timeout period to receive the connect acknowledgment. When the acknowledgment does not arrive before timeout, the initiator NIC re-sends the connect packet. The new connect packet may use the same PSN value as the previous one, as shown in FIG. 3B. Alternatively, it may be advantageous for the initiator to assign a new PSN value in the new connect packet, typically a larger value (such as PSN+1), so that the responder will be able to identify it easily as the later one (if the responder actually received the first connect packet). Upon receiving the new connect packet, the responder NIC replies with an ACK, stating the assigned S_ID value. If the responder NIC did, in fact, acknowledge the first DC connect packet from this initiator (but the acknowledgment was, evidently, lost), it assigns a new S_ID value in this later acknowledgment. The responder NIC will then service only those data packets from this DC initiator that contain the new S_ID and the appropriate PSN values.

After the initiator NIC receives the ACK packet with session ID from the responder, it proceeds to transmit data packets containing the appropriate S_ID and PSN values, as described above, until the connection is torn down.

Handling of DC Responder Context

Figure 4:
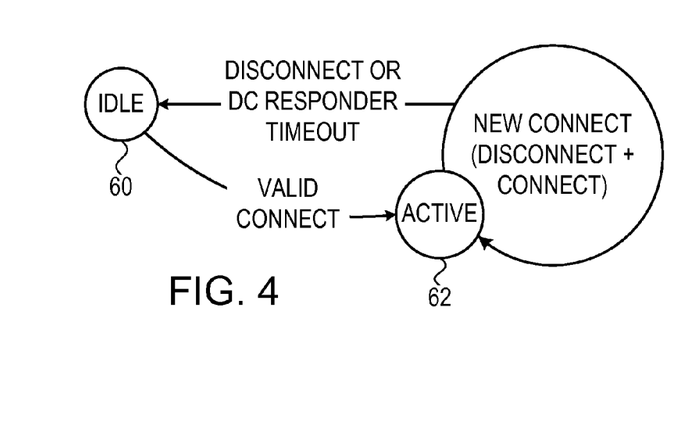
FIG. 4 is a state diagram that schematically illustrates operation of a DC responder context, in accordance with an embodiment of the present invention.

FIG. 4 is a state diagram that schematically illustrates operation of a DC responder (DCR) context in NIC 32, in accordance with an embodiment of the present invention. The DCR context is held in an idle state 60 until required for use. Upon receiving a valid connect packet from a DC initiator, specifying a DC target (DCT) to which this DCR context is assigned, the responder NIC transfers the context to an active state 62, in which a dynamic connection is established with the DC initiator. The DCR context may be uniquely assigned to one DCT, or it may be configured to be shared among a group of DCTs on a given node. In this latter case, a connect packet directed to any of the DCTs in the group can cause the DCR to transition from state 60 to state 62.

The DCR context remains in active state 62 for as long as the DC responder that it is serving continues to receive data packets from the DC initiator on the current dynamic connection. Upon receiving a disconnect packet from the DC initiator, the DCR context returns to idle state 60. Similarly, if no more data packets are received from the DC initiator over a preconfigured timeout period, the DCR context returns to the idle state. Once in the idle state, the DCR context is available to be reactivated by the same DCT or, if the DCR is shared, by another DCT in the sharing group. The DCR context, even when idle, is typically held in cache 52 (FIG. 2) until flushed to memory 46 by a later-activated context. Therefore, reuse of a shared DCR context by another DCT increases the chance of a cache hit when the DCR context is reactivated and can thus enhance the speed of setting up new dynamic connections.

When the DCR context is in active state 62, i.e., connected to a given DC initiator, it may in certain cases receive a further connect packet from the same initiator. This sort of event can occur, for example, in the scenario described above, wherein the DC initiator fails to receive an acknowledgment sent by the responder and therefore re-sends the connect packet. In this case, the DCR context treats the new connect packet as though it were a request to disconnect the previous dynamic connection and open a new one. The new connection receives a new session ID, which is reported by the DC responder to the DC initiator in an ACK packet as described above.

Figure 5:
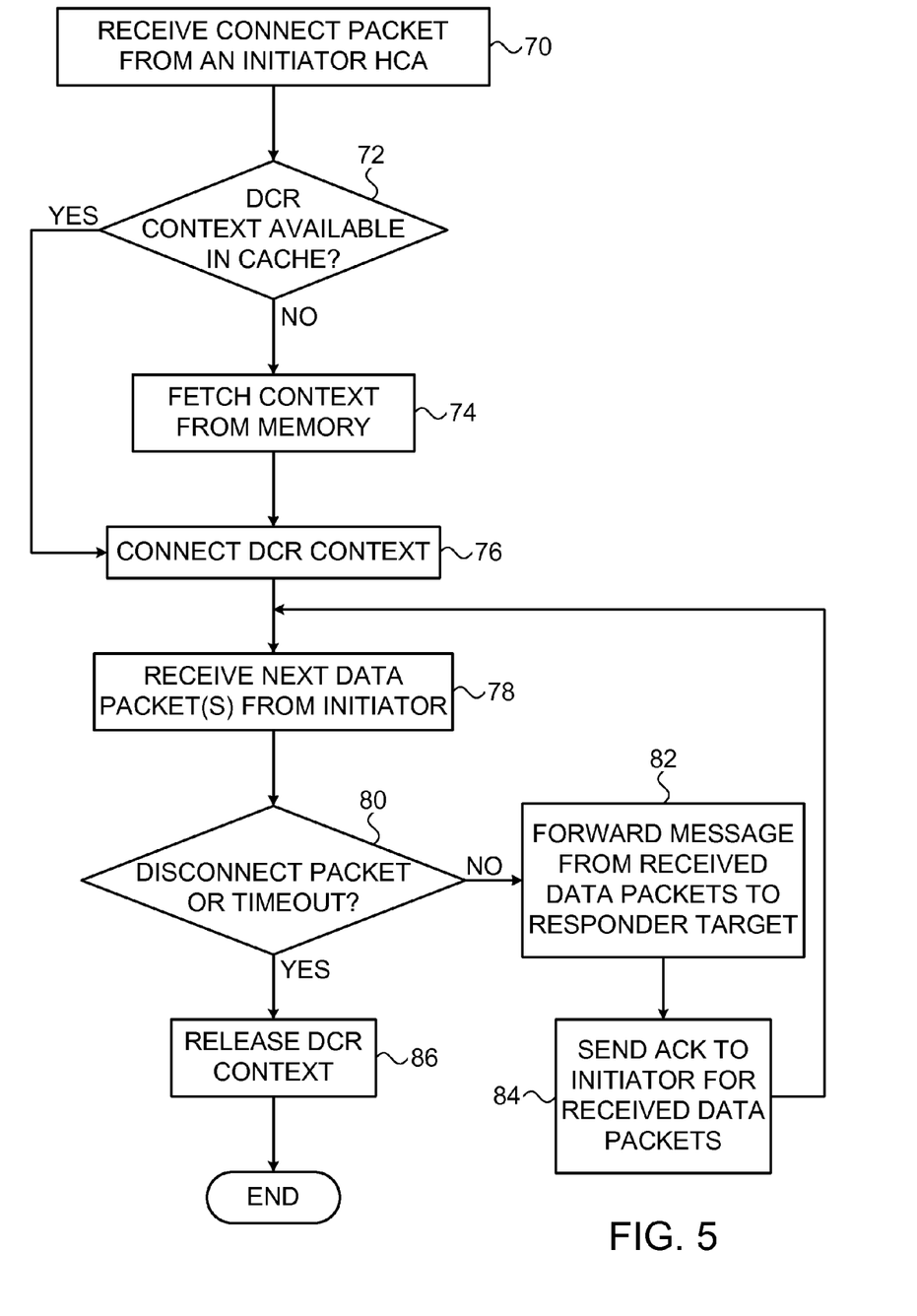
FIG. 5 is a flow chart that schematically illustrates a method for processing packets received by a DC transport target, in accordance with an embodiment of the present invention.

FIG. 5 is a flow chart that schematically illustrates a method for processing packets received on a DC transport service, in accordance with an embodiment of the present invention. NIC 32 on a target node (for example, node 26) receives a connect packet from the NIC of an initiator node (say node 22) over network 30, at a connect request step 70. The DC connect packet carries all the information required to establish a dynamic connection between the sending DC initiator and one DC responder context at the target node.

Upon reception of the connect packet, NIC 32 on node 26 attempts to allocate a DCR context out of the pool of contexts available to the DCT targeted by the connect packet. Processing circuitry 50 in NIC 32 checks whether an appropriate DC responder context is available in context cache 52, at a cache checking step 72. As noted earlier, this context may be uniquely assigned to the given DCT, or it may be shared among a group of DCTs of which the given DCT is a member. If an appropriate DCR context is not available in cache 52, processing circuitry 50 instructs host interface 48 to fetch the DCR context from memory 46, at a context fetching step 74, and waits for the context to reach the cache before proceeding.

When the desired DCR context is in cache 52, processing circuitry 50 establishes the connection using this DCR context, at a connection step 76. If the DC initiator has requested a handshake (as explained above), circuitry 50 assigns a session ID to the dynamic connection and sends an ACK packet containing the session ID to the initiator. At this point, the DCR context is active and ready to process inbound data packets. If NIC 32 has no DCR context available to handle the connect request received at step 70, circuitry 50 may send a NAK back to the initiator, which may then retry the connection after a predefined backoff time has passed.

Following the connect packet, NIC 32 receives the first data packet from node 22 over network 30, via network interface 56, at a data reception step 78. Processing circuitry 50 checks each packet to determine whether it is a disconnect packet, at a disconnect checking step 80. If not, circuitry 50 forwards the message to the appropriate target process executing on host 34, at a message transfer step 82, typically by writing data to an assigned location in memory 46. NIC 32 may send an ACK packet back to the initiator, acknowledging receipt of the data packet or packets, at an acknowledgment step 84, and the method then returns to step 78.

If at step 80, however, the received data packet is found to be a disconnect packet, or if the preset timeout expires without receipt of further packets on the connection, processing circuitry 50 tears down the association between the target process and the DC responder context, at a disconnection step. The context then becomes available to connections from additional initiator processes and, in the case of a shared DCR context, to other DCTs.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    allocating, in a network interface controller (NIC) coupled to an initiator host, a single dynamically-connected (DC) initiator context for serving requests from an initiator process running on the initiator host to transmit data, via a packet network, to multiple target processes, including at least first and second target processes, running on one or more target nodes;
    transmitting from the NIC over the packet network a first connect packet directed to the first target process and referencing the DC initiator context so as to open a first dynamic connection with the first target process;
    receiving at the NIC over the packet network, in response to the first connect packet, a first acknowledgment packet containing a first session identifier (ID), which is assigned by a first DC responder that is associated with the first target process;
    following receipt of the first acknowledgment packet, transmitting one or more first data packets containing the first session ID over the first dynamic connection from the NIC to the first target process;
    after transmission of the first data packets, closing the first dynamic connection and transmitting from the NIC over the packet network a second connect packet directed to the second target process and referencing the DC initiator context so as to open a second dynamic connection with the second target process;
    receiving at the NIC over the packet network, in response to the second connect packet, a second acknowledgment packet containing a second session identifier (ID), which is assigned by a second DC responder that is associated with the second target process; and
    following receipt of the second acknowledgment packet, transmitting one or more second data packets containing the second session ID over the second dynamic connection from the NIC to the second target process.

2. The method according to claim 1, and comprising receiving at the NIC over the packet network further acknowledgment packets in response to the first and second data packets.

3. The method according to claim 2, wherein closing the first dynamic connection comprises waiting to receive at least one of the further acknowledgment packets in response to the first data packets before closing the first dynamic connection.

4. The method according to claim 1, wherein closing the first dynamic connection comprises transmitting a disconnect packet over the first dynamic connection, and wherein the one or more target nodes do not acknowledge the disconnect packet.

5. The method according to claim 1, and comprising, upon a failure to receive the second acknowledgment packet within a predefined timeout period following transmission of the second connect packet, transmitting over the network a third connect packet directed to the second target process, and awaiting acknowledgment of the third connect packet before transmitting the one or more second data packets.

6. The method according to claim 1, wherein transmitting the first connect packet comprises inserting a packet serial number of a first one of the first data packets into the first connect packet.

7. The method according to claim 1, wherein the first and second target processes both run on a given target node, and wherein the method comprises allocating, at the given target node, a single dynamically-connected responder context for serving both the first and second dynamic connections.

8. Apparatus for communication, comprising:
 a network interface, coupled to a packet network;
 a host interface, which is coupled to receive requests from an initiator process running on an initiator host to transmit data, via the packet network, to multiple target processes, including at least first and second target processes, running on one or more target nodes; and
 processing circuitry, which is configured, using a single dynamically-connected (DC) initiator context for serving requests the initiator host, to transmit via the network interface a first connect packet directed to the first target process and referencing the DC initiator context so as to open a first dynamic connection with the first target process, to receive via the network interface, in response to the first connect packet, a first acknowledgment packet containing a first session identifier (ID), which is assigned by a first DC responder that is associated with the first target process, and following receipt of the first acknowledgment packet, to transmit one or more first data packets containing the first session ID via the network interface over the first dynamic connection to the first target process,
 wherein the processing circuitry is configured to close the first dynamic connection after transmission of the first data packets, to transmit via the network interface a second connect packet directed to the second target process and referencing the DC initiator context so as to open a second dynamic connection with the second target process, to receive via the network interface, in response to the second connect packet, a second acknowledgment packet containing a second session identifier (ID), which is assigned by a second DC responder that is associated with the second target process, and following receipt of the second acknowledgment packet, to transmit one or more second data packets containing the second session ID via the network interface over the second dynamic connection to the second target process.

9. The apparatus according to claim 8, wherein the processor is configured to receive, via the network interface, and to process further acknowledgment packets in response to the first and second data packets.

10. The apparatus according to claim 9, wherein the processing circuitry is configured to wait to receive at least one of the further acknowledgment packets in response to the first data packets before closing the first dynamic connection.

11. The apparatus according to claim 8, wherein the processing circuitry is configured to transmit, via the network interface, a disconnect packet over the first dynamic connection, and wherein the one or more target nodes do not acknowledge the disconnect packet.

12. The apparatus according to claim 8, wherein the processing circuitry is configured, upon a failure to receive the second acknowledgment packet within a predefined timeout period following transmission of the second connect packet, to transmit via the network interface a third connect packet directed to the second target process, and to await acknowledgment of the third connect packet before transmitting the one or more second data packets.

13. The apparatus according to claim 8, wherein the processing circuitry is configured to insert a packet serial number of a first one of the first data packets into the first connect packet.

14. The apparatus according to claim 8, wherein the first and second target processes both run on a given target node, which is configured to allocate a single dynamically-connected responder context for serving both the first and second dynamic connections.

* * * * *